E. BRAUBURGER.
PHOTOGRAPHIC CAMERA.
APPLICATION FILED MAY 26, 1906.

944,595.

Patented Dec. 28, 1909.
2 SHEETS—SHEET 1.

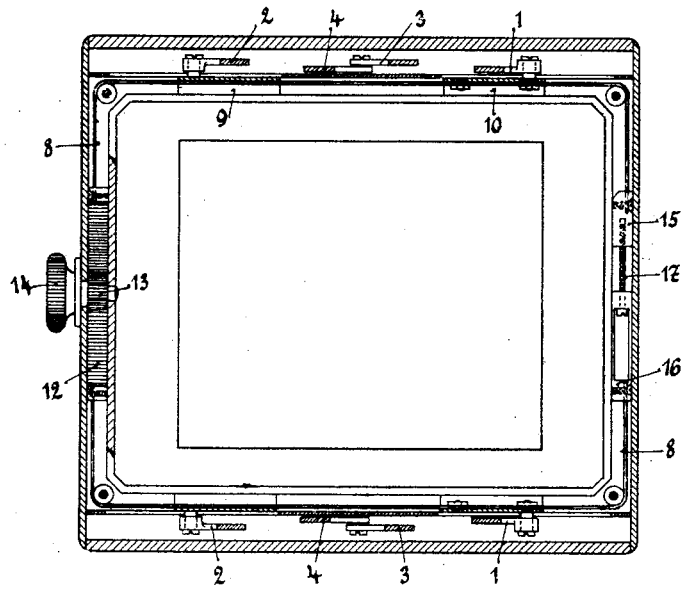

UNITED STATES PATENT OFFICE.

ERNST BRAUBURGER, OF FRIEDENAU, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

PHOTOGRAPHIC CAMERA.

944,595.     Specification of Letters Patent.     Patented Dec. 28, 1909.

Application filed May 26, 1906. Serial No. 318,804.

*To all whom it may concern:*

Be it known that I, ERNST BRAUBURGER, a citizen of the German Empire, and resident of Friedenau, near Berlin, Germany, engineer, have invented certain new and useful Improvements in Photographic Cameras, of which the following is a specification.

This invention relates to photographic cameras in which the objective-holder is connected with the plate-holder by means of a system or systems of shear-levers.

The purpose of the invention is to provide means for operating the said levers in order to adjust the distance between the objective and the plane of the sensitized plate.

The means used in the present invention, for operating the connecting levers preferably comprise an endless wire, band, cord, chain or other traction-device passing over rollers or other suitable guides and connected with the shear-levers to be moved. This band or the like is preferably so arranged, that it surrounds one of the two frames connected by the shear-levers, and is, therefore, located in a plane perpendicular or approximately perpendicular to the objective axis. If several pairs of shears are used one member of each pair may be connected with a band, so that by moving the latter all the shears are simultaneously operated. To increase the reliability of the action two parallel bands are preferably used, and one member of each pair of shears is connected to one of the said bands, and the other member to the other band. In this case the two bands must be moved in opposite directions. This can be effected in a very simple manner by connecting each band with a rack and by causing the two racks to mesh with a toothed wheel arranged between them.

The invention is illustrated in the annexed drawing, in which—

Figure 1:
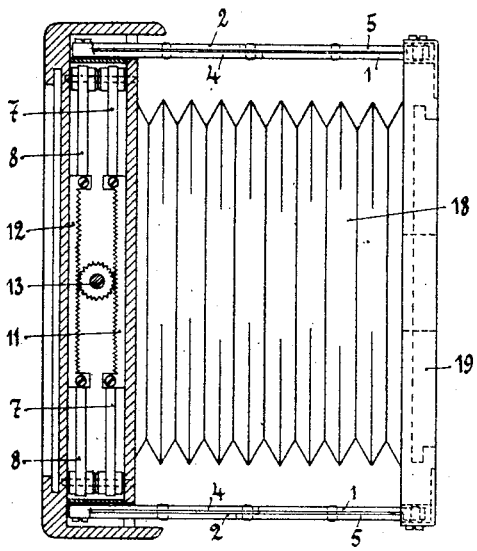
Figure 2:
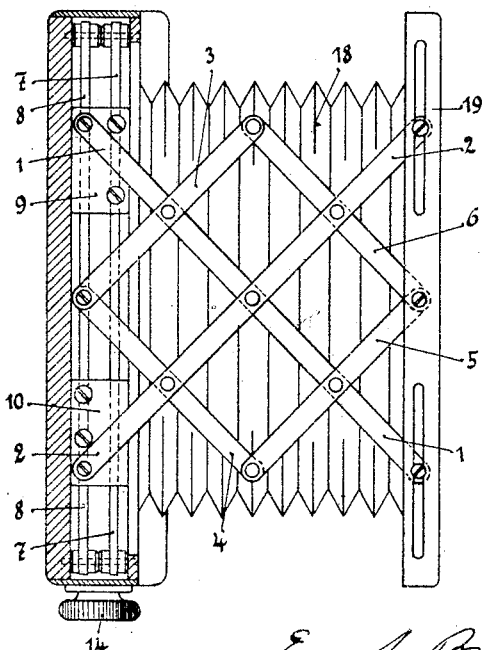

Figure 1 is a side-view of a camera provided with the improved adjusting-device, Fig. 2 being a plan-view thereof. Fig. 3 is an end-view of the frame supporting the bands by means of which the shear-levers are operated.

The camera shown in Figs. 1 to 3 comprises two frames connected with each other by means of a bellows and by two systems of levers arranged in the form of lattice-work and adapted to be operated by means of two endless bands which surround one of the frame parts. The principal members of each of the said systems of levers consist of two shear-levers 1 and 2 connected with each other by means of links 3, 4, 5 and 6. The two lever-systems are arranged at opposite sides of the camera. 7 and 8 represent the bands by means of which the levers are operated, both levers 1 being connected to the band 7 and both levers 2 to the band 8. The connection between the bands and the levers are made by means of guide-pieces 9 and 10 attached to the bands. The gear for moving the bands is arranged at one side of the camera and comprises two racks 11 and 12 and a gear-wheel 13 arranged between the latter and meshing with both. The ends of the band 7 are attached to the rack 11, and the ends of the band 8 to the rack 12. The spindle to which the gear-wheel is fixed is adapted to be rotated by means of a milled button 14. At the opposite side of the camera each of the bands is provided with a tensioning-device comprising two slides 15 and 16 connected with each other by means of an adjusting screw 17, as shown in Fig. 3.

18 represents the bellows and 19 the other frame. The latter can be moved, by means of the levers, toward or from the frame surrounded by the bands 7 and 8, the direction of movement depending on the direction in which the button 14 is rotated.

While the invention has been described as to the details of construction, I do not mean to limit myself to the special details because these may obviously be modified within the scope of the appended claims. Especially do I wish to be understood that instead of two sets of shear-like levers on opposite sides of the camera an arbitrary number or one set of such levers may be used. So also it is apparent that by the term "bands" I mean to include any form of flexible device such as wires, chains, cords and the like.

Having now particularly described and ascertained the nature of the said invention and in what manner the same is to be performed, I declare that what I claim is:—

1. In a photographic camera comprising relatively movable frames connected together by means of a system of levers, slidably guided traction devices each in the form of a strip arranged in a plane substantially perpendicular to the objective axis and substantially surrounding one of said frames for operating said levers.

2. In a photographic camera, the combination of two frames, shear-like levers arranged at the sides of said frames, slidably guided traction devices each in the form of a strip surrounding one of said frames and movably connected to said levers, and an operating gear for moving said traction devices in opposite directions at the same time for adjusting the frames.

3. In a photographic camera, two frames, shear-like connections being provided at the sides thereof, and two slidably guided traction devices arranged side by side on one of said frames and movably connected to said shear-like connections, one member of the shear-like connections being movably connected to one of the traction devices and the other to the second traction device at each side of said frame.

4. In a photographic camera, two frames, shear-like connections arranged at the sides of said frames, traction devices movably connected to said shear-like connections and arranged side by side on one of said frames and surrounding the same, a rack inserted into each traction device, the teeth of one rack being opposite the teeth of the rack on the other traction device, and a pinion arranged between said racks and meshing therewith.

5. In a photographic camera comprising relatively movable frames connected together by means of a system of levers, traction devices each in the form of a continuous strip substantially surrounding one of said frames and arranged in a plane substantially perpendicular to the objective axis and adapted to operate said levers by longitudinal displacement.

6. In a photographic camera the combination of two frames, shear-like levers arranged at the side of said frames, traction devices, each in the form of a continuous strip substantially surrounding one of said frames and movably connected to said levers and an operating gear for longitudinally moving said traction devices in opposite directions at the same time for adjusting the frames.

In testimony whereof I have signed this specification in the presence of two subscribing witnesses.

ERNST BRAUBURGER.

Witnesses:
   HENRY HASPER,
   WOLDEMAR HAUPT.